United States Patent
Tu et al.

(10) Patent No.: US 9,394,967 B2
(45) Date of Patent: Jul. 19, 2016

(54) THREE-DIMENSIONAL SHOCK-ABSORBING DEVICE

(71) Applicant: ATOMIC ENERGY COUNCIL-INSTITUTE OF NUCLEAR ENERGY RESEARCH, Taoyuan County (TW)

(72) Inventors: Hsuan-Te Tu, Taoyuan County (TW); Cheng-Ban Chung, Taoyuan County (TW); Chii-Neng Ou Yang, Taoyuan County (TW); Yi-Ru Hsu, Taoyuan County (TW)

(73) Assignee: Atomic Energy Council—Institute of Nuclear Energy Research, Taoyuan County (TW)

( * ) Notice: Subject to any disclaimer, the term of this patent is extended or adjusted under 35 U.S.C. 154(b) by 0 days.

(21) Appl. No.: 14/483,267

(22) Filed: Sep. 11, 2014

(65) Prior Publication Data

US 2015/0076315 A1     Mar. 19, 2015

(30) Foreign Application Priority Data

Sep. 13, 2013   (TW) .............................. 102133293 A (51) Int. Cl.
*F16M 13/00*     (2006.01)
*F16F 15/067*    (2006.01)
*F16F 15/02*     (2006.01)

(52) U.S. Cl.
CPC ............. *F16F 15/067* (2013.01); *F16F 15/021* (2013.01)

(58) Field of Classification Search
CPC ............. E04B 1/98; E04H 9/02; E01D 19/04; F16F 15/067; F16F 15/021
See application file for complete search history.

(56) References Cited

U.S. PATENT DOCUMENTS 3,212,745 A * 10/1965 Lode ....................... F16F 15/02
                                                       248/580
4,496,130 A *  1/1985 Toyama ....................... 248/585

* cited by examiner

*Primary Examiner* — Amy Sterling
(74) *Attorney, Agent, or Firm* — Rosenberg, Klein & Lee (57) ABSTRACT

The present invention provides a three-dimensional shock-absorbing device, which comprises a base, a carrying base, and a carrying platform. The carrying base is disposed between the base and the carrying platform. A first elastic member is disposed between carrying base and the base for providing vertical shock-absorbing effect. A first limiting groove and a sliding member are disposed between the carrying platform and the carrying base for providing horizontal shock-absorbing effect. In addition, second elastic members connected to the base are disposed on the periphery of the carrying platform for providing horizontal and vertical shock-absorbing effects concurrently and thus achieving three-dimensional shock-absorbing effects. Moreover, the present invention has more support and less tipping. Besides, it is more durable.

11 Claims, 10 Drawing Sheets

THREE-DIMENSIONAL SHOCK-ABSORBING DEVICE

FIELD OF THE INVENTION

The present invention relates generally to a shock-absorbing device, and particularly to a three-dimensional shock-absorbing device capable of absorbing shock in three dimensions.

BACKGROUND OF THE INVENTION

Although natural disasters are unavoidable, people can lower the loss caused by them. When an earthquake occurs, precision machines or electronic instruments can be impacted by strong acceleration, which can damage the internal components and lead to abnormal operations or loss of functions. Taiwan is located in fault zones and has frequent earthquakes. After the Fukushima nuclear disaster of Japan, the government further emphasizes the nuclear safety when earthquakes occur. The regulations are modified for raising the anti-earthquake levels for the instruments pertinent to nuclear power generation. By adding shock absorbers under the instruments, the overall anti-earthquake level can be improved without replacing the instruments. Thereby, the safety of the instruments pertinent to nuclear power generation as well as the safety of civilians can be maintained.

Shock absorbers can isolate the vibrations of the earth surface caused by earthquakes, so that the objects situated above the shock-absorbing system can encounter less impact. Shock absorbers can be installed under instruments without influencing existing instruments. The shock absorbers require almost no repair and maintenance.

A shock absorber is an anti-earthquake system with substantial flexibility. When a general earthquake occurs, a shock absorber enables the instrument carried thereon to have nearly rigid responses. Thereby, the deformation on the instruments is reduced. The probability that the internal components are damaged is significantly reduced.

In the Taiwan Patent Publication Number M283083, a multi-functional track-type anti-vibration device is disclosed. In the invention, a pair of flat and straight sliding tracks are disposed in an alternate or parallel fashion. In addition, a sliding connecting device is disposed between the two flat and straight sliding tracks. By using the functions of the elastic members in the sliding connecting device, the effects of vibration isolation and reduction and automatic recovery between the substrate and the carrying plate are provided. Nonetheless, when a vertical force exerts on the sliding tracks, the sliding tracks will be destroyed by the stress. Besides, the weights of the carrying plate and the carried objects are supported mainly by the junctions of the sliding tracks, which tend to deform by the weights. Moreover, if only two tracks are disposed, it is difficult for the carrying plate to maintain balanced. If the carrying plate tips, the track-type anti-vibration device or the carried objects will be damaged.

In the Taiwan Patent Publication Number M313692, a multi-directional multi-frequency shock absorber is disclosed. According to the invention, a sliding connecting device is disposed between the facing surfaces of the substrate and the carrying plate. In addition, the substrate has a curved concave and a unidirectional sliding track is disposed on the carrying plate. Thereby, the sliding blocks on both ends of the sliding connecting device can contact and sliding on the curved concave and the unidirectional sliding track, respectively. Moreover, the two sliding blocks of the sliding connecting device is connected by a universal bearing. Consequently, different shock-isolating/reducing frequencies and displacements can be produced in different directions. Nonetheless, similarly, there are those problems, including damages by the stress of vertical forces on the unidirectional sliding track, and deformation on the device and unbalanced carrying plate due to the smaller pivot when only a shock-absorber is disposed.

In the Taiwan Patent Publication Number 1306911, a shock-absorbing device having an exchange mechanism between static and dynamic forces is disclosed. According to the invention, one or more set of concaves is disposed on the facing surfaces of the substrate and the carrying plate correspondingly. In each set of concaves, a rollable sphere is disposed. In addition to the sphere and the concaves, a damper can be further disposed for reinforcing the shock-reducing effect. Besides, a static-force carrying member is further disposed outside the concave of the substrate. Thereby, when no earthquake occurs, the weights of the carrying plate and the carried object are supported by the static-force carrying member, preventing the problem of wear or permanent deformation on the damper due to pressure. Nonetheless, its limiting function in the horizontal direction is inferior. When the earthquake is fierce, the carrying plate may escape from the top of the substrate, leading to damage in the shock-absorbing device or the carried object.

According to the prior art, there are technologies using tracks, balls, or universal bearings, with the accompanying spring or damper, for reducing horizontal displacements of the carrying plate and achieving the shock-absorbing effect, they still have the drawbacks of inferior vertical or horizontal shock-absorbing effect and ease of tipping. Thereby, there is still room for improvement in the structure.

The present invention improves the drawbacks in the prior art and provides a shock absorber for reducing the influences of vibration. A carrying base is added between the carrying platform and the base. A first elastic member is disposed between the carrying base and the base for providing vertical shock-absorbing effect. In addition, a first limiting groove is disposed on the top of the carrying base. By using a sliding member, the relative horizontal displacement between the carrying platform and the carrying base can be reduced and thus achieving three-dimensional shock-absorbing effect. Besides, a second elastic member is disposed on the periphery of the carrying platform and connected to the bottom plate or the sidewalls. In addition to limiting the horizontal displacement of the carrying platform, the elasticity of the spring can be used to reinforcing the shock-absorbing effect in the horizontal and vertical directions. Compared with the current known shock-absorbers, the structure according to the present invention provides superior shock-absorbing effect and is more durable.

SUMMARY

An objective of the present invention is to provide a three-dimensional shock-absorbing device, which has shock-absorbing effect in the horizontal and vertical directions.

Another objective of the present invention is to provide a three-dimensional shock-absorbing device, which includes a design capable of avoiding shift in the structure or preventing influence of the structure on the shock-absorbing effect.

In order to achieve the objectives described above, the present invention provides a three-dimensional shock-absorbing device, which includes a base having a bottom plate and a plurality of sidewalls. The plurality of sidewalls are disposed on the bottom plate for forming an accommodating space. At least a first elastic member is disposed on the bottom plate inside the accommodating space. A carrying base is disposed on the first elastic member. The carrying base is disposed in the accommodating space. At least a first limiting groove is disposed on the top of the carrying base. The first limiting groove has a sliding member inside. A carrying platform is disposed on the sliding member. A plurality of second elastic members are disposed on the periphery of the carrying platform. One end of each of the plurality of second elastic members is connected to the carrying platform while the other end thereof is connected to the bottom plate.

In addition, based on the structure described above, the connection of the plurality of second elastic members can be altered according to the present invention. One end of each of the plurality of second elastic members can be further connected to the carrying platform and the other end thereof can be connected to the sidewall. The same shock-absorbing effect as the above structure can be thus achieved.

Moreover, the above structure according to the present invention can further include a first recess on the bottom plate for accommodating the first elastic member. Besides, a second recess can be further disposed on the bottom of the carrying platform opposite to the first recess for accommodating the first elastic member. A slope part is also disposed outside the top end of the sidewall for reducing the influence on the second elastic member.

DETAILED DESCRIPTION

In order to make the structure and characteristics as well as the effectiveness of the present invention to be further understood and recognized, the detailed description of the present invention is provided as follows along with embodiments and accompanying figures.

According to prior art, there are technologies using tracks, balls, or universal bearings, with the accompanying spring or damper, for reducing horizontal displacements of the carrying plate and achieving the shock-absorbing effect, they still have the drawbacks of inferior vertical or horizontal shock-absorbing effect and ease of tipping. Thereby, there is still room for improvement in the structure. Accordingly, the present invention provides a three-dimensional shock-absorbing device for achieving excellent shock-absorbing effect in three dimensions. Compared with the current known shock-absorbers, the structure according to the present invention provides superior shock-absorbing effect and is more durable, making it an invention with novelty and nonobviousness.

Figure 1:
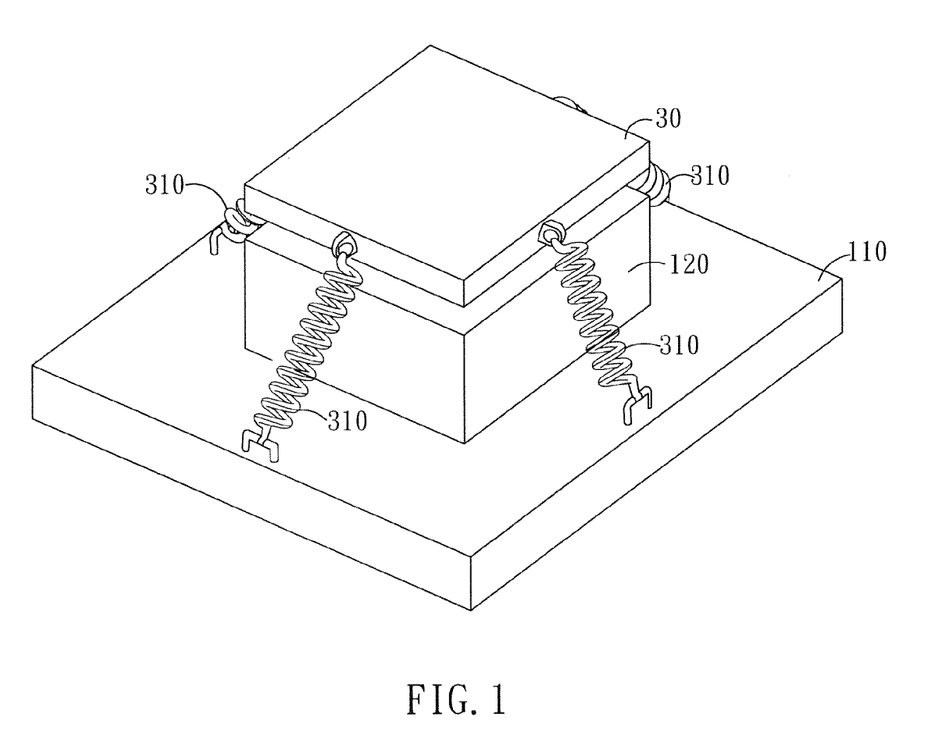
FIG. 1 shows a three-dimensional structure according to the present invention.

Please refer to FIG. 1. The outward appearance of the present invention is a structure having a plurality of springs. By using the structure according to the present invention, excellent three-dimensional shock-absorbing effect can be achieved. Please refer to FIGS. 2A and 2B together. The present invention provides a three-dimensional shock-absorbing device, which includes a base 10 having a bottom plate 110 and a plurality of sidewalls 120. The plurality of sidewalls 120 are disposed on the bottom plate 110 for forming an accommodating space 130. At least a first elastic member 210 is disposed in the accommodating space 130 and on the bottom plate 110. A carrying base 20 is disposed on the first elastic member 210. At least a first limiting groove 220 is disposed on the top of the carrying base 20. The first limiting groove 220 further has a sliding member 230 inside. A carrying platform 30 is then disposed on the sliding member 230. A plurality of second elastic members 310 are disposed on the periphery of the carrying platform 30. One end of each of the plurality of second elastic members 310 is connected to the carrying platform 30 while the other end thereof is connected to the bottom plate 110.

Figure 2A:
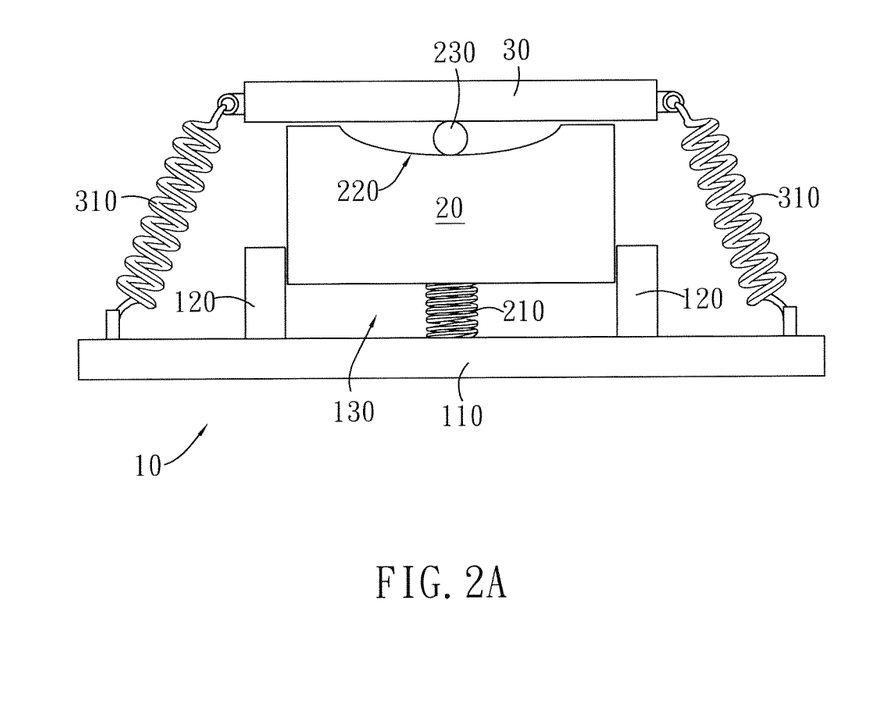
FIG. 2A shows a structural cross-sectional view according to an embodiment of the present invention.
Figure 2B:
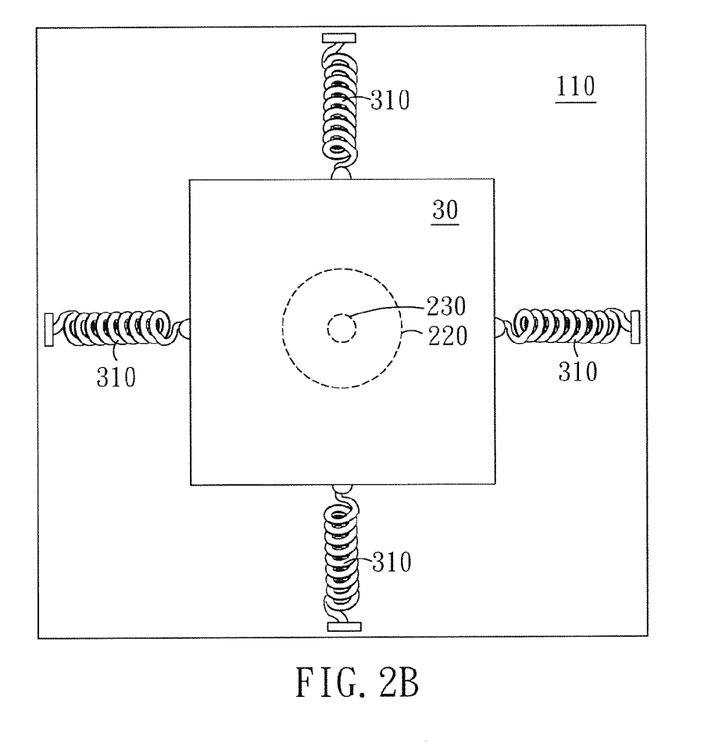
FIG. 2B shows a top view according to an embodiment of the present invention.

The present invention uses the carrying platform 30 to carry an object. When the object is shook by external force, the plurality of first elastic members 210 on the bottom plate 110 will expand and contract up and down. The carrying platform 20 will be shook by the extension and contraction of the first elastic members 210. Nonetheless, the horizontal movement of the plurality of first elastic members 210 and the carrying platform 20 is limited; they can move only in the up and down direction. Next, the sliding member 230 on the top of the carrying base 20 is disposed on the carrying platform 30. The carrying platform 30 attaches tightly to the sliding member 230 due to the weights of the carrying platform 30 and the object. Thereby, when an external force is applied, the carrying platform 30 and the sliding member 230 will move in the horizontal direction. In addition, when the object and the carrying platform 30 vibrate, the second elastic members 310 will limit the horizontal and vertical displacements of the object and the carrying platform 30, and thus reducing the amplitude of vibration of the carrying platform 30.

According to the present invention, instruments, precision machines, delicate structures, or even large buildings are placed on the carrying platform 30. The present invention does not limit the carried objected on the carrying platform 30. The carrying platform 30 forms the accommodating space 130 by using the plurality of sidewalls 120 of the substrate 10. The carrying base 20 is disposed on the first elastic member 210. By using the first elastic member 210, the object on the carrying platform 30 of the carrying base 20 and the carried object on the carrying platform 30 can be buffered. Besides, by disposing the carrying base 20 on the accommodating space 130, the horizontal motion of the carrying base 20 can be limited, which prevents distraction of the vertical elasticity of the first elastic member 210 due to the horizontal motion of the carrying base 20. Hence, when no carried object is on the carrying platform 30, the height of the plurality of sidewalls 120 should be greater than the distance between the carrying base 20 and the bottom plate 110 and supported by the first elastic member 210.

Moreover, the first limiting groove 220 is disposed on the top of the carrying base 20. The sliding member 230 is disposed in the first limiting groove 220. The carrying platform 30 is disposed on the sliding member 230. The carrying platform 30 is limited horizontally by the sliding member 230 and the first limiting groove 220. By using the sliding member 230, the horizontal motion between the carrying base 20 and carrying platform 30 is reduced. In addition, because the first limiting groove has a curved surface, the center of the curved surface of the first limiting groove 220 is the lowest and the peripheral regions are the highest. The weight of the carried object on the carrying platform 30 exerts a downward force on the sliding member 230. Thereby, the sliding member 230 experiences a sliding force towards the center of the curved surface of the first limiting groove 220, which is located at the lowest point. The height of the sliding member 230 should be greater than the depth of the first limiting groove 220, so that the carrying platform 30 contacts the sliding member 230 only.

Furthermore, the sides of the carrying platform 30 are connected an end of the plurality of second elastic members 310. The other end of the plurality of second elastic members 310 is connected to the bottom plate 110. Because the plurality of second elastic members 310 exert horizontal pulling forces and downward forces on the carrying platform 30 for limiting the horizontal and vertical motions of the carrying platform 30, the number of the plurality of second elastic members 310 is equal to or greater than three. Only three second elastic members 310 exert forces concurrently in three different directions can the minimum horizontal balance requirement be satisfied.

According to the present invention, at least a first elastic member 210 is disposed between the bottom plate 110 and the carrying base 20, so that when the carried objected on the carrying platform 30 experiences vertical external force, the elasticity of the first elastic member 210 can buffer the vertical external force. In addition, by using the plurality of sidewalls 120, the force of the first elastic member 210 will not dissipate in the horizontal direction, and thus reinforcing the shock-absorbing effect in the vertical direction. By taking advantage of the relation between the first limiting groove 220 and the sliding member 230, when the carried object on the carrying platform 30 experiences horizontal external force, the sliding member 230 can mitigate the relative horizontal motion between the carrying platform 30 and the carrying base 20 and thus reinforcing the horizontal shock-absorbing effect. Furthermore, by using the plurality of second elastic members 310 connected between the carrying platform 30 and the bottom plate 110, the horizontal force balance of the carrying platform 30 can be limited and the downward pulling force can be increased. Thereby, the carrying platform 30 can be disposed stably on the sliding member 230. Besides, the horizontal and vertical shock-absorbing effects can be reinforced as well.

Figure 3:
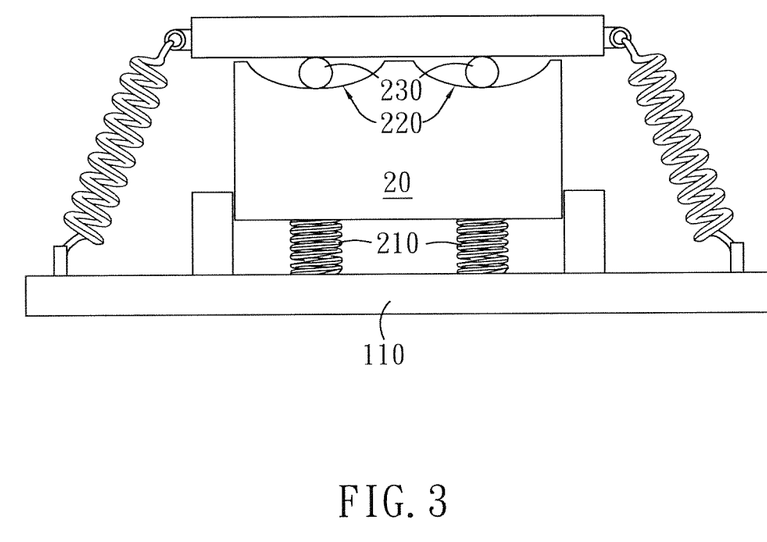
FIG. 3 shows a structural cross-sectional view according to another embodiment of the present invention.

Please refer to FIG. 3. According to the present invention, the number of the first elastic members 210 is adjusted according to the weight of the carried object. If the carried object is heavier, the number of the first elastic members 210 is greater for reinforcing vertical shock-absorbing effect. In addition, the numbers of the first limiting groove 220 and the sliding members 230 can be adjusted according to the weight of the carried object as well for reinforcing horizontal shock-absorbing effect. Nonetheless, the present invention does not limit the number of the added components. The number can be adjusted according to the requirement.

Figure 4:
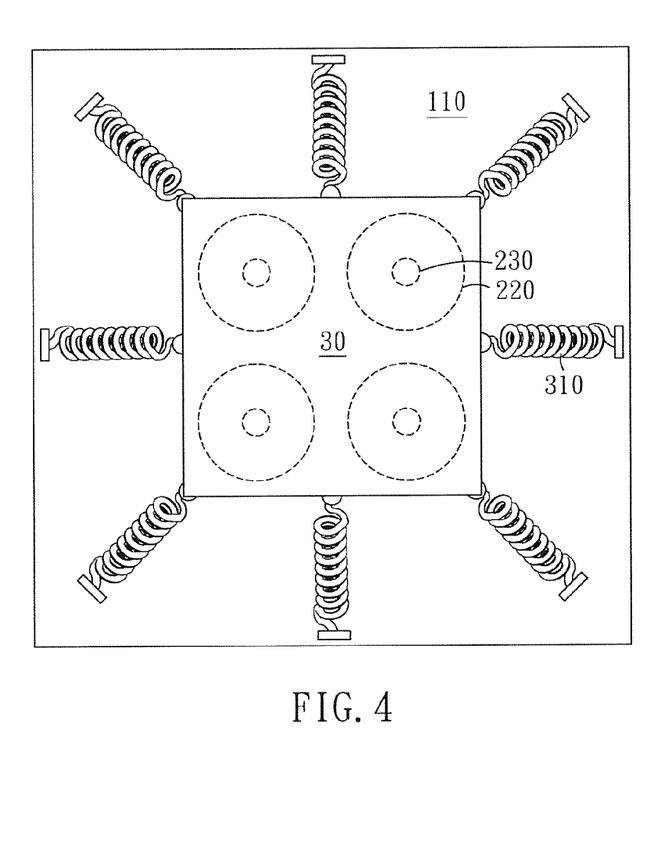
FIG. 4 shows a top view according to another embodiment of the present invention.

Please refer to FIG. 4. According to the present invention, the plurality of second elastic members 310 are disposed on the sides of the carrying platform 30. The number of the second elastic members 310 is not limited. However, at least three second elastic members 310 disposed evenly in three directions are required for horizontal force balance. If four second elastic members 310 are disposed, they are disposed at two pairs of opposing locations for reaching horizontal force balance. In FIG. 4, an embodiment of the present invention is provided. According to the embodiment, eight second elastic members 310 are disposed, forming four pairs of opposing force balance. This is only an embodiment of the present invention. The disposition of the plurality of second elastic members 310 must satisfy horizontal force balance.

Figure 5:
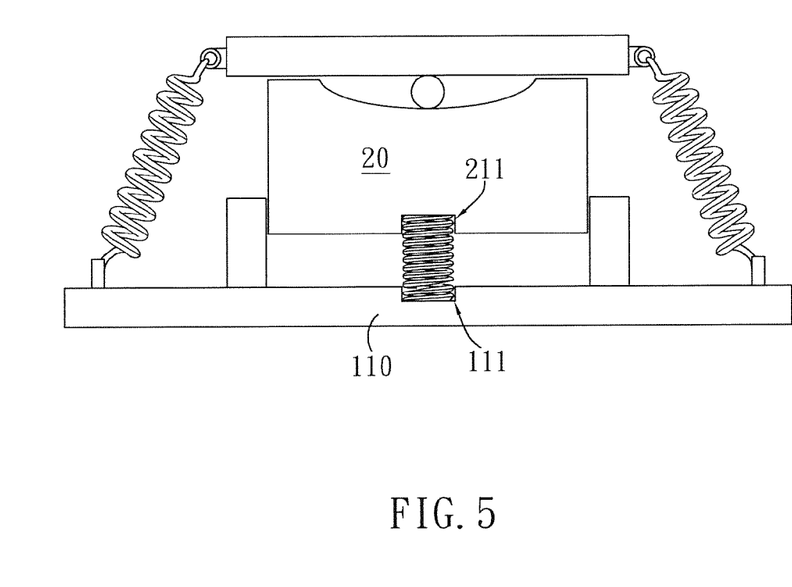
FIG. 5 shows a schematic diagram of the first recess and the second recess according to the present invention.

Please refer to FIG. 5. According to the present invention, a first recess 111 is added on the bottom plate 110 for accommodating the corresponding first elastic member 210. The first elastic member 210 is disposed in the first recess 111 for fixing the first elastic member 210. Thereby, the location of the first elastic member 210 on the bottom plate 110 will not be shifted by external force. The depth of the first recess 111 is smaller than the height of the compressed first elastic member 210. In addition, a second recess 211 is added on the bottom of the carrying base 20 for accommodating the corresponding first elastic member 210. The first elastic member 210 is disposed in the second recess 211. Thereby, the location of the first elastic member 210 on the carrying base 20 will not be shifted by external force. The depth of the second recess 211 is smaller than the height of the compressed first elastic member 210. Alternatively, the first and second recesses 111, 211 can be disposed concurrently for further fixing the location of the first elastic member 210. The depth of the first recess 111 plus that of the second recess 211 should be smaller than the height of the compressed first elastic member 210. By using the above method, the location of the first elastic member 210 can be fixed. Once the location of the first elastic member 210 is shifted and skewed by external force, part of the force will be dissipated in the horizontal direction and thus reducing the vertical force of the first elastic member 210.

Figure 6A:
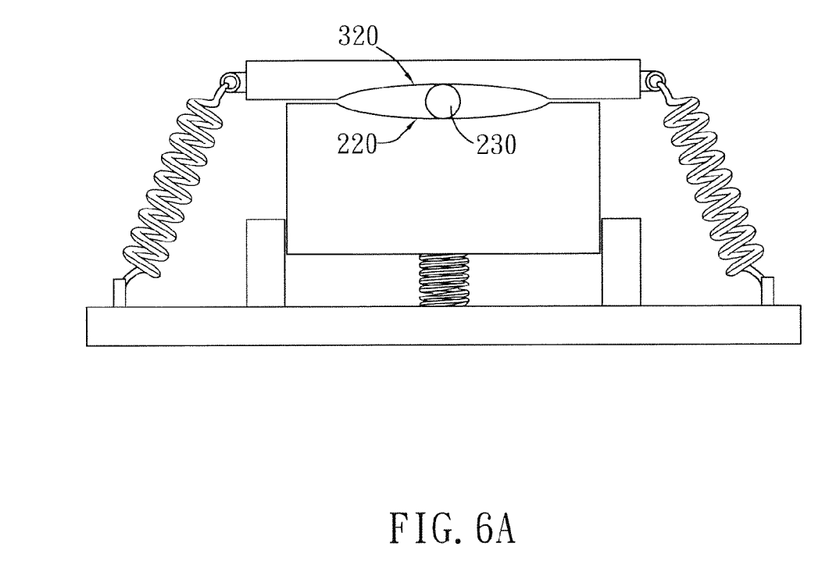
FIG. 6A shows a schematic diagram of the second limiting groove according to the present invention.
Figure 6B:
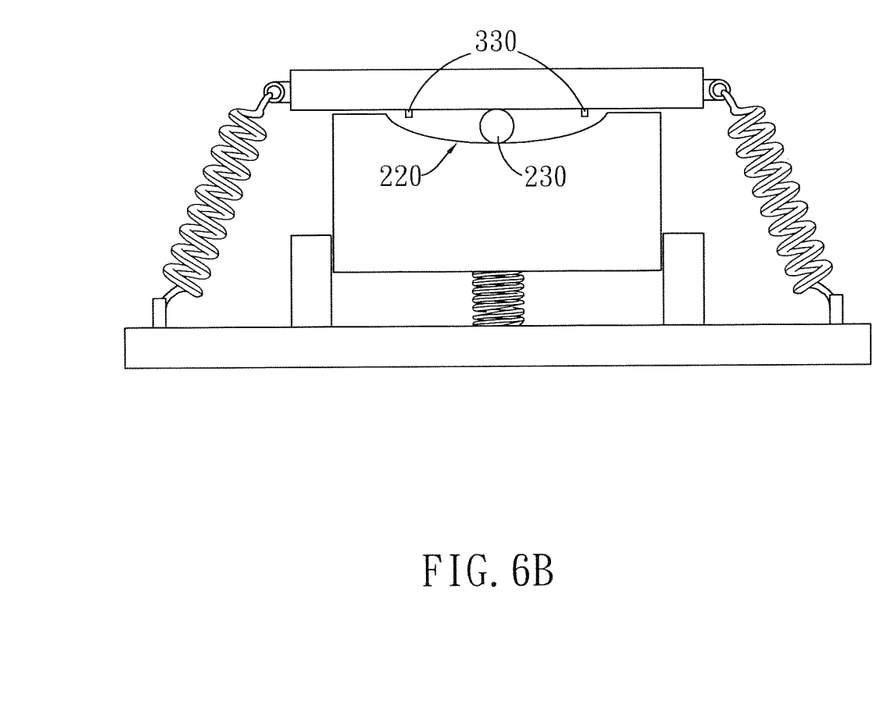
FIG. 6B shows a schematic diagram of the limiter according to the present invention.

Please refer to FIG. 6A. According to the present invention, a plurality of second limiting grooves 320 are disposed on the bottom of the carrying platform 30. The plurality of second limiting grooves 320 correspond to the first limiting groove 220 and can be curved or plane recesses. The main purpose of the second limiting groove 320 is to limit the horizontal moving range of the sliding member 230. The depth of the first limiting groove 220 plus that of the second limiting groove 320 should be smaller than the height of the sliding member 230. In addition, please refer to FIG. 6B. A plurality of limiters 330 can be added to the bottom of the carrying platform 30. The limiters 330 are projective blocking members with the same purpose of limiting the horizontal moving range of the sliding member 230. By two method described above are both to prevent the sliding member 230 from sliding out of the first limiting groove 220 easily due to excessive external impact. By adding the second limiting groove 320 or the limiter 330, the integrity of the shock-absorbing device can be further secured.

Figure 7:
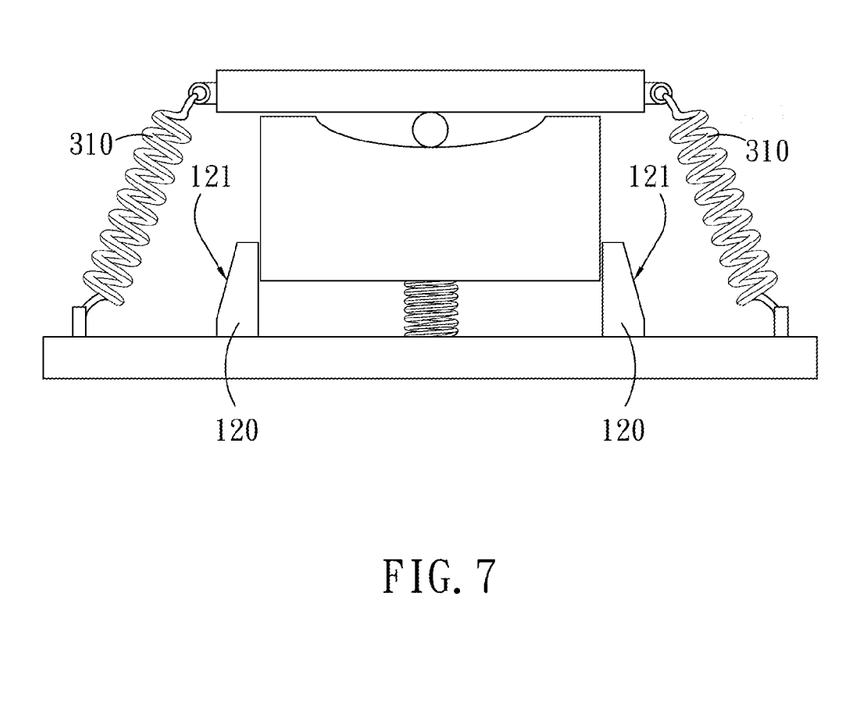
FIG. 7 shows a schematic diagram of the slope parts of the sidewalls according to the present invention.

Please refer to FIG. 7. According to the present invention, the corner of upper outer side of the sidewall 120 is cut off for producing a slope part 121. When the second elastic member 310 vibrates due to external force, the second elastic member 310 may get stuck or hooked by the upper outer side of the sidewall 120 if excessive vibration occurs and thereby the shock-absorbing effect will be influenced. Accordingly, by disposing the slope part 121, the influence can be reduced.

Figure 8:
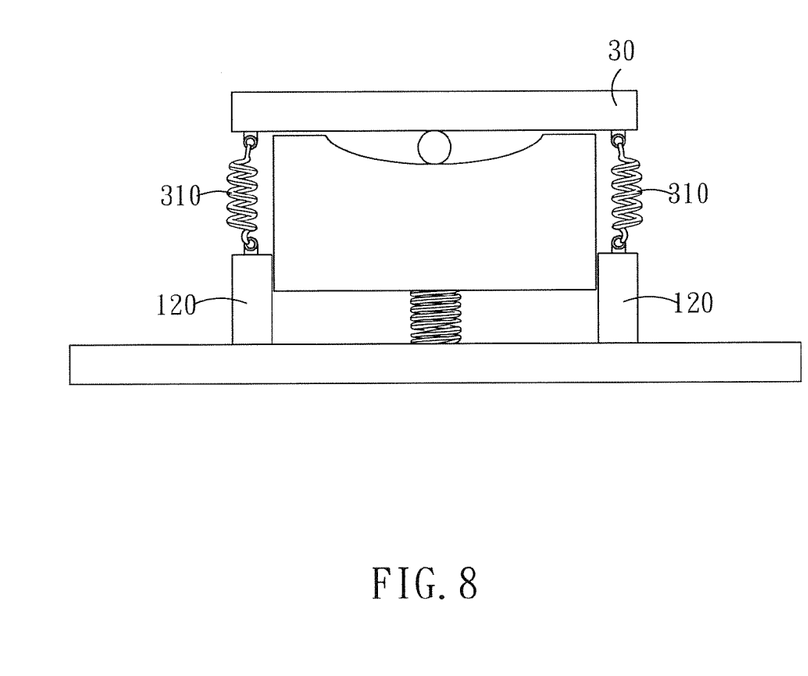
FIG. 8 shows a structural cross-sectional view according to another embodiment of the present invention.

Please refer to FIG. 8, which is another embodiment of the present invention. The difference between the present embodiment and the one on FIG. 2A is that, according to the present embodiment, the periphery of the carrying platform 30 is connected to one end of the second elastic member 310 while the other end thereof is connected to the plurality of sidewalls 120. Like the embodiment in FIG. 2A, the structure according to the present embodiment can have identical shock-absorbing effect.

To sum up, the present invention provides a three-dimensional shock-absorbing device, which includes the base 10 having the bottom plate HO and a plurality of sidewalls 120. The plurality of sidewalk 120 are disposed on the bottom plate 110 for forming an accommodating space 130. At least a first elastic member 210 is disposed in the accommodating space 130 and on the bottom plate 110. A carrying base 20 is disposed on the first elastic member 210. At least a first limiting groove 220 is disposed on the top of the carrying base 20. The first limiting groove 220 further has a sliding member 230 inside. A carrying platform 30 is then disposed on the sliding member 230. A plurality of second elastic members 310 are disposed on the periphery of the carrying platform 30. One end of each of the plurality of second elastic members 310 is connected to the carrying platform 30 while the other end thereof is connected to the bottom plate 110 or the plurality of sidewalls 120. Moreover, the above structure according to the present invention can further include the first recess 111 and the second recess 211 for accommodating the corresponding first elastic member 210. Besides, the plurality of second limiting groove 320 or the plurality of limiters 330 corresponding to the plurality of first limiting grooves 220 can be added on the bottom of the carrying platform 30. In addition, a slope part 121 is further disposed on the sidewall. According to the above method of the present invention, a three-dimensional shock-absorbing device in the horizontal and vertical directions is provided.

Accordingly, the present invention conforms to the legal requirements owing to its novelty, nonobviousness, and utility. However, the foregoing description is only embodiments of the present invention, not used to limit the scope and range of the present invention. Those equivalent changes or modifications made according to the shape, structure, feature, or spirit described in the claims of the present invention are included in the appended claims of the present invention.

The invention claimed is:

1. A three-dimensional shock-absorbing device, comprising:
   a base, having a bottom plate with a plurality of sidewalls for forming an accommodating space;
   at least a first elastic member, disposed on said bottom plate and in said accommodating space;
   a carrying base, disposed on said first elastic member and in said accommodating space, having at least a first limiting groove on the top, and having a sliding member inside said first limiting groove, said sliding member can move in a horizontal direction along a surface in said first limiting groove;
   a carrying platform, disposed on said sliding member; and
   a plurality of second elastic members, disposed on said bottom plate having one end fixed to said carrying platform, and having the other end fixed to said bottom plate.

2. The shock-absorbing device of claim 1, wherein the height of said plurality of sidewalls is greater than the distance between said bottom plate and said carrying base.

3. The shock-absorbing device of claim 1, wherein the height of said sliding member is greater than the depth of said first limiting groove.

4. The shock-absorbing device of claim 1, and further comprising a slope part on the upper outer corner of said plurality of sidewalls.

5. The shock-absorbing device of claim 1, and further comprising a first recess on said bottom plate for accommodating said corresponding first elastic member.

6. The shock-absorbing device of claim 5, wherein the depth of said first recess is smaller than the height of said compressed first elastic member.

7. The shock-absorbing device of claim 1, and further comprising a second recess on the bottom of said carrying base for accommodating said corresponding first elastic member.

8. The shock-absorbing device of claim 7, wherein the depth of said second recess is smaller than the height of said compressed first elastic member.

9. The shock-absorbing device of claim 1, and further comprising a second limiting groove corresponding to said first limiting groove on the bottom of said carrying platform.

10. The shock-absorbing device of claim 9, wherein the height of said sliding member is greater than the depth of said first limiting groove plus the depth of said second limiting groove.

11. The shock-absorbing device of claim 1, and further comprising a plurality of limiters corresponding to said first limiting groove on the bottom of said carrying platform.

* * * * *